United States Patent

Spatafora

[11] Patent Number: 6,115,991
[45] Date of Patent: Sep. 12, 2000

[54] MACHINE FOR CONDITIONING PACKETS OF CIGARETTES

[75] Inventor: Mario Spatafora, Bologna, Italy

[73] Assignee: G. D Societá per Azioni, Bologna, Italy

[21] Appl. No.: 09/237,165

[22] Filed: Jan. 25, 1999

[30] Foreign Application Priority Data

Jan. 27, 1998 [IT] Italy .................. BO98A0026

[51] Int. Cl.[7] .................................................. B65B 19/02
[52] U.S. Cl. .................. 53/151; 53/202; 53/234
[58] Field of Search ............................ 53/148, 149, 150, 53/151, 168, 202, 234, 444; 131/283

[56] References Cited

U.S. PATENT DOCUMENTS

| 3,750,676 | 8/1973 | Kruse et al. .................. 53/148 X |
| 3,924,386 | 12/1975 | Schmermund .................. 53/148 X |
| 4,330,976 | 5/1982 | Blackall et al. .................. 53/151 |
| 4,484,432 | 11/1984 | Oberdorf .................. 53/234 X |
| 4,548,019 | 10/1985 | Kruse .................. 53/234 X |
| 4,559,757 | 12/1985 | Focke et al. .................. 53/234 X |
| 4,607,477 | 8/1986 | Hinchcliffe et al. .................. 53/148 X |
| 4,636,186 | 1/1987 | Focke et al. . |
| 4,718,216 | 1/1988 | Focke et al. .................. 53/444 |
| 4,819,343 | 4/1989 | Focke et al. . |
| 4,819,407 | 4/1989 | Focke et al. .................. 53/234 X |
| 4,840,007 | 6/1989 | Focke et al. . |
| 4,883,161 | 11/1989 | Focke . |
| 4,936,440 | 6/1990 | Focke et al. . |
| 4,942,715 | 7/1990 | Focke . |
| 4,999,970 | 3/1991 | Bamrungbhuet et al. .................. 53/234 X |
| 5,038,546 | 8/1991 | Oberdorf .................. 53/234 X |
| 5,046,295 | 9/1991 | Knecht .................. 53/202 |
| 5,129,209 | 7/1992 | Focke . |
| 5,216,869 | 6/1993 | Boldrini et al. .................. 53/234 X |
| 5,299,679 | 4/1994 | Obara et al. .................. 53/149 X |
| 5,611,191 | 3/1997 | Bailey et al. .................. 53/148 |
| 5,628,162 | 5/1997 | Kreusch et al. .................. 53/168 |
| 5,678,385 | 10/1997 | Focke et al. .................. 53/148 |
| 5,755,080 | 5/1998 | Draghetti et al. . |

FOREIGN PATENT DOCUMENTS

| 0 741 081 | 11/1996 | European Pat. Off. . |
| 393 172 | 10/1965 | Switzerland . |
| 2 138 382 | 10/1984 | United Kingdom . |
| 2 164 622 | 3/1986 | United Kingdom . |
| 2 252 541 | 8/1992 | United Kingdom . |

Primary Examiner—Daniel B. Moon
Attorney, Agent, or Firm—Marshall, O'Toole, Gerstein, Murray & Borun

[57] ABSTRACT

A machine for conditioning packets of cigarettes is divided into a first portion defined by a number of outlets of a hopper through which cigarettes are fed in a first direction; a second portion in which a succession of adjacent conveyors defines a single supply path for the cigarettes and relative packets, the supply path extending substantially in a second direction crosswise with respect to the first direction; and a third portion in which a drying conveyor defines a number of parallel drying paths extending in a third direction crosswise with respect to the second direction.

9 Claims, 6 Drawing Sheets

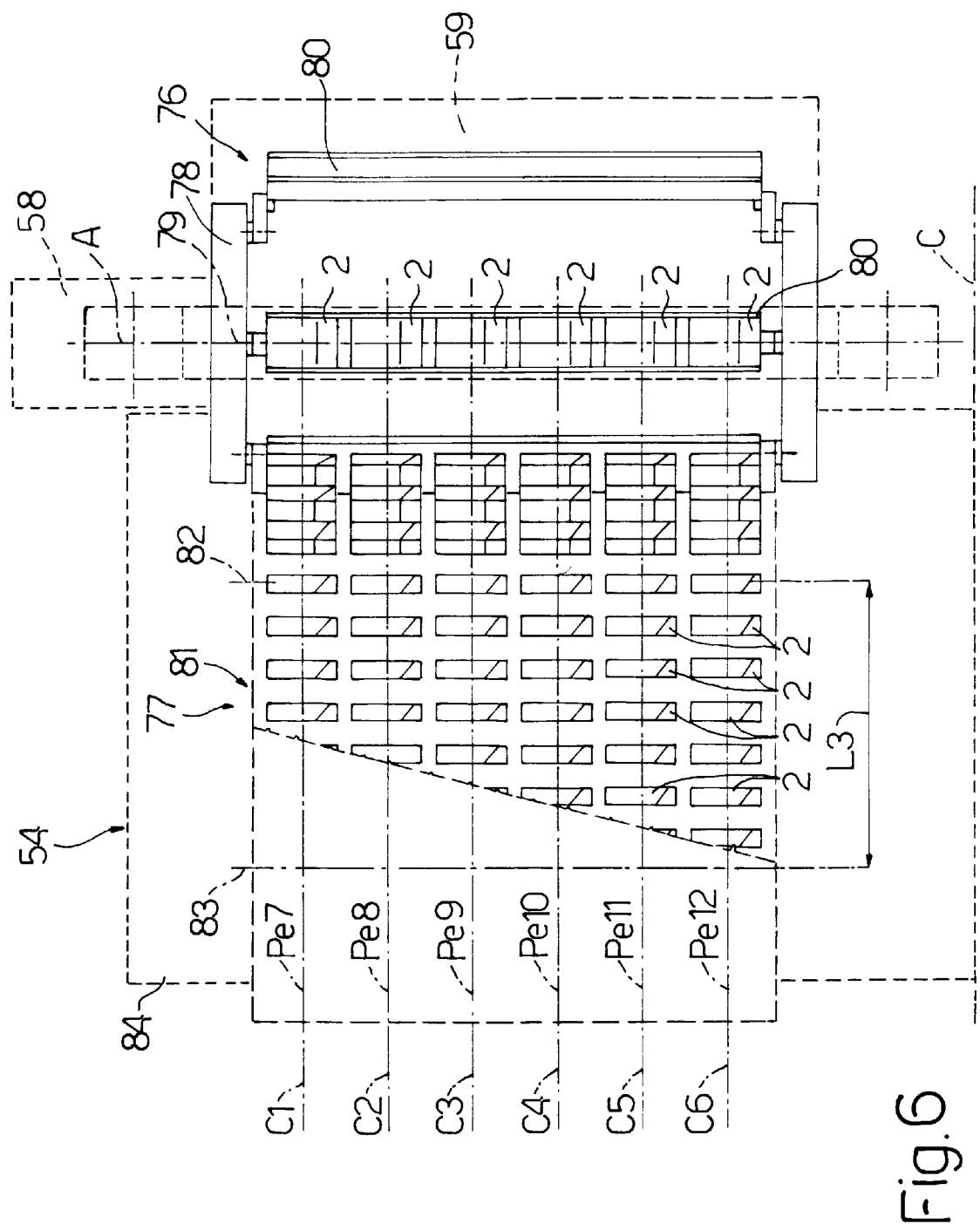

MACHINE FOR CONDITIONING PACKETS OF CIGARETTES

BACKGROUND OF THE INVENTION

The present invention relates to a machine for conditioning, i.e., making packets of cigarettes.

Packets of cigarettes normally comprise a group of cigarettes packed in packing material and containing a given number of cigarettes arranged in layers, and conditioning machines for producing such packets comprise a first portion in which the cigarettes are arranged into groups divided into layers, a second portion in which the groups are packed in packing material secured by an adhesive substance, and a third portion in which the packets are fed into respective pockets, each of which provides for snugly housing and maintaining a desired shape of the packet as the packet is fed along a drying path to allow the adhesive substance to set.

The first portion comprises a hopper having at least one outlet with substantially vertical channels, down which the cigarettes are fed under their own weight and that of the cigarettes on top; and means for extracting a group or layer from the outlet and feeding the group or layer onto a feed conveyor for supplying a succession of packing wheels, which form part of said second portion, and which provide for both forming and feeding the packets to a drying conveyor forming part of said third portion.

In response to increasing demand for higher-output conditioning machines, technical solutions are continually being devised to increase the traveling speed of the conveyors and the speed at which the groups and packets are transferred between adjacent conveyors. Particularly effective in increasing the output of conditioning machines has been the adoption of continuously-moving conveyors as opposed to conventional step-operated types. Continuously-moving conveyors have proved particularly effective when applied to said second portion of the machine, and have enabled a substantial increase in the traveling speed of the packets and cigarettes, while at the same time preventing the packets or cigarettes from being damaged. For this reason, the second portion of the conditioning machine is often referred to as the fast portion, and the first and third portions—in which continuously-moving conveyors have proved less effective—as the slow portions. The slowness of the first portion is a consequence of the physical limitations of the cigarettes, which are fed down the channels under their own weight, and of the fact that any attempt to accelerate the downward travel of the cigarettes results in damage, such as tobacco fallout from the ends and bending, if not actual breakage, of the cigarettes. The slowness of the third portion, on the other hand, is a consequence of the time taken by the adhesive substance to dry, and which is allowed by feeding the packets slowly along a path of given length. On the other hand, reducing drying time using heaters to set the adhesive substance faster would only result in rapid surface drying of the substance, in delayed drying of the central portion of the substance, and, therefore, in an increase in overall drying time.

Consequently, machine output has been increased by increasing the number of hopper outlets and the length of the drying paths cooperating with the fast portion. Patent DE 3,046,065, for example, relates to a conditioning machine comprising a first portion with two hopper outlets for simultaneously forming two groups of cigarettes, which are fed, in the second portion, to a drum comprising equally spaced pockets, and which is operated in steps twice as long as the spacing of the pockets. The drum, in turn, feeds the groups to a packing line defined by further drums, which feed the finished packets along a single packing path to two drying drums defining respective parallel drying paths. In other words, the machine described comprises a fast portion defined by the step-operated drums, but which are operated in steps twice as long as the spacing of the pockets, and two slow portions: the first portion featuring two outlets, i.e. two group-forming lines; and the third portion defined by two drying drums, i.e. two drying lines or paths.

The adoption of continuous packing lines has called for a further increase in the number of slow-portion lines, which, however, over and above a given number, seriously complicate the conditioning machine as a whole. On the other hand, limiting the number of drying lines calls for fairly long drying paths, thus increasing the length and size of the machine.

SUMMARY OF THE INVENTION

It is an object of the present invention to provide a machine for making cigarettes designed to eliminate the aforementioned drawbacks.

According to the present invention, there is provided a machine for making packets of cigarettes, each packet comprising a group containing a given number of cigarettes; said machine being characterized by comprising a first portion, in turn, comprising a hopper having a number of outlets for feeding the cigarettes in a first direction; a second portion, in turn, comprising a succession of conveyors adjacent to one another and defining a single supply path substantially extending in a second direction crosswise with respect to said first direction; and a third portion, in turn, comprising a drying conveyor defining a number of drying paths extending parallel to one another in a third direction substantially crosswise to said second direction.

BRIEF DESCRIPTION OF THE DRAWINGS

A non-limiting embodiment of the present invention will be described by way of example with reference to the accompanying drawings, in which:

FIG. 6 shows a schematic front view of the FIG. 4 machine.

DETAILED DESCRIPTION OF THE INVENTION

Figure 1:
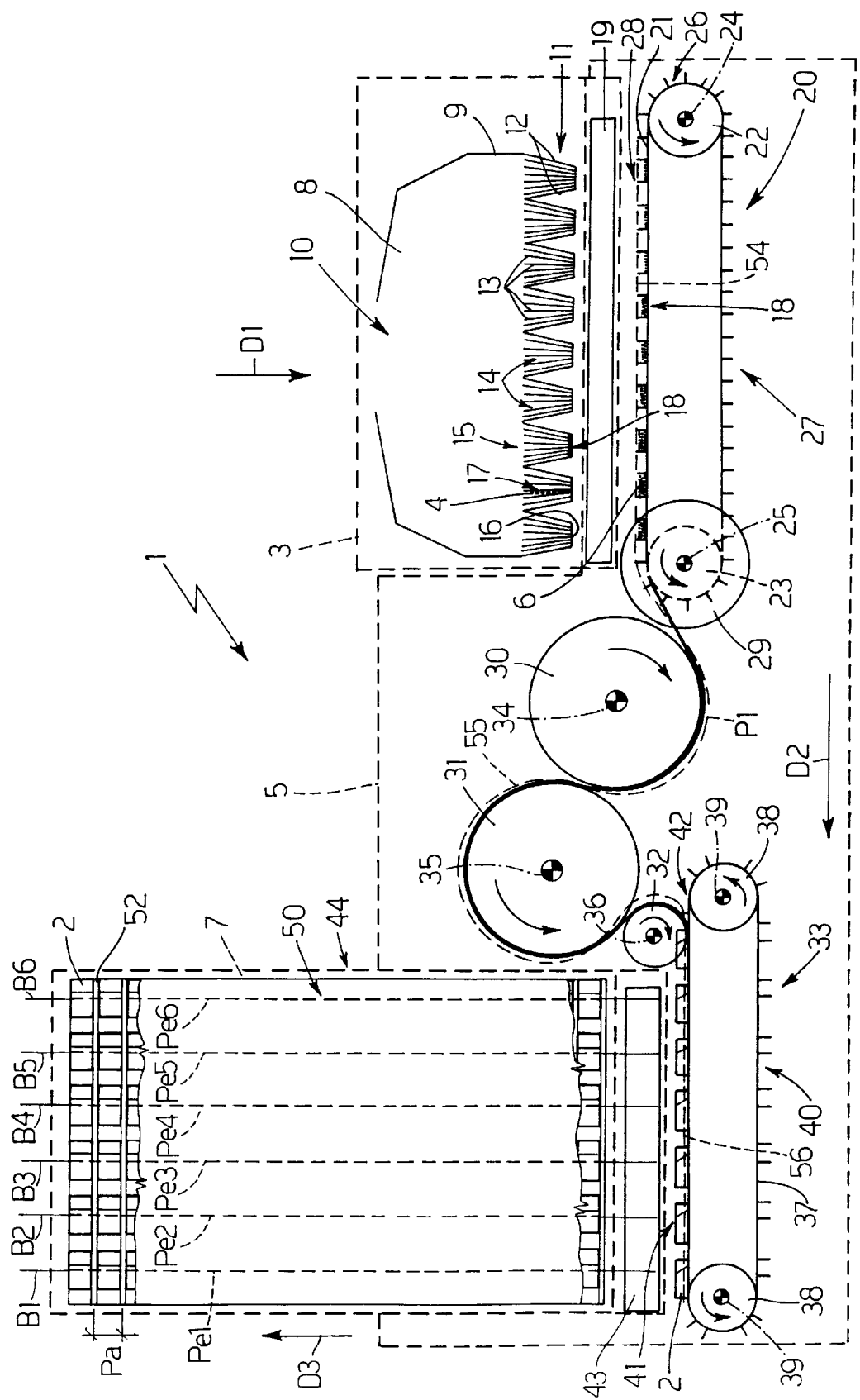
FIG. 1 shows a schematic side view of a first embodiment of the machine according to the invention.
Figure 2:
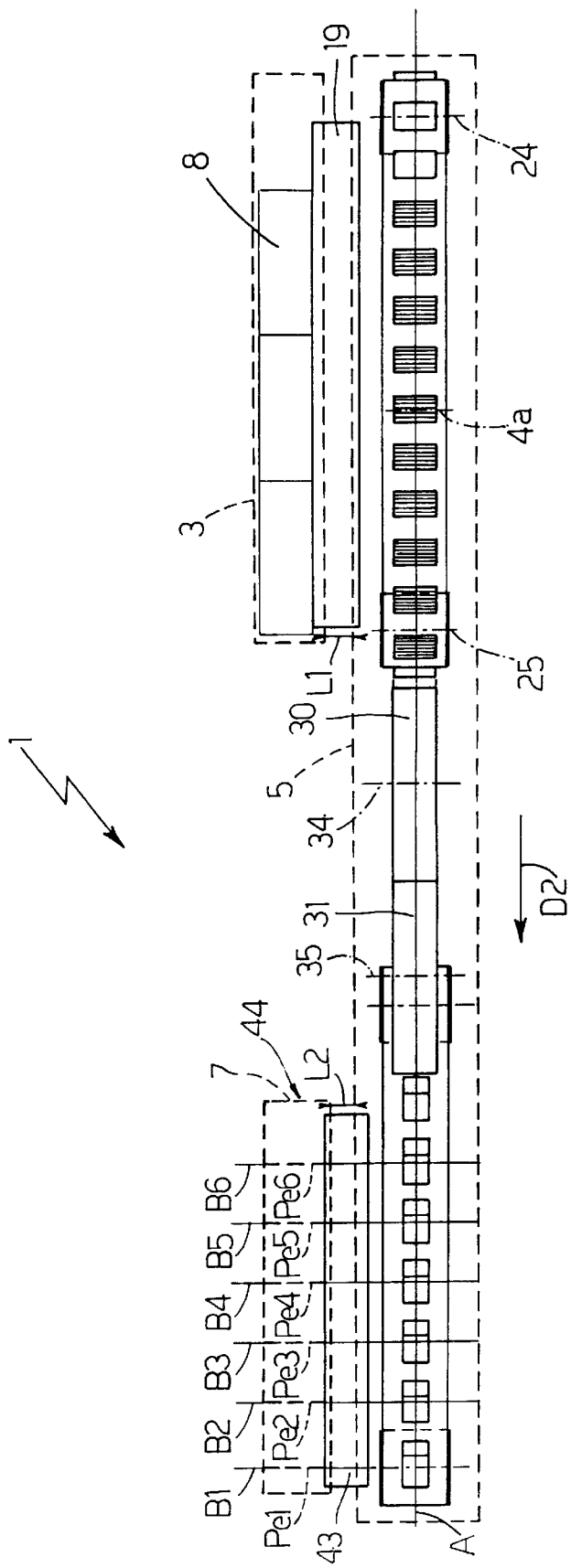
FIG. 2 shows a schematic plan view of the FIG. 1 machine.
Figure 3:
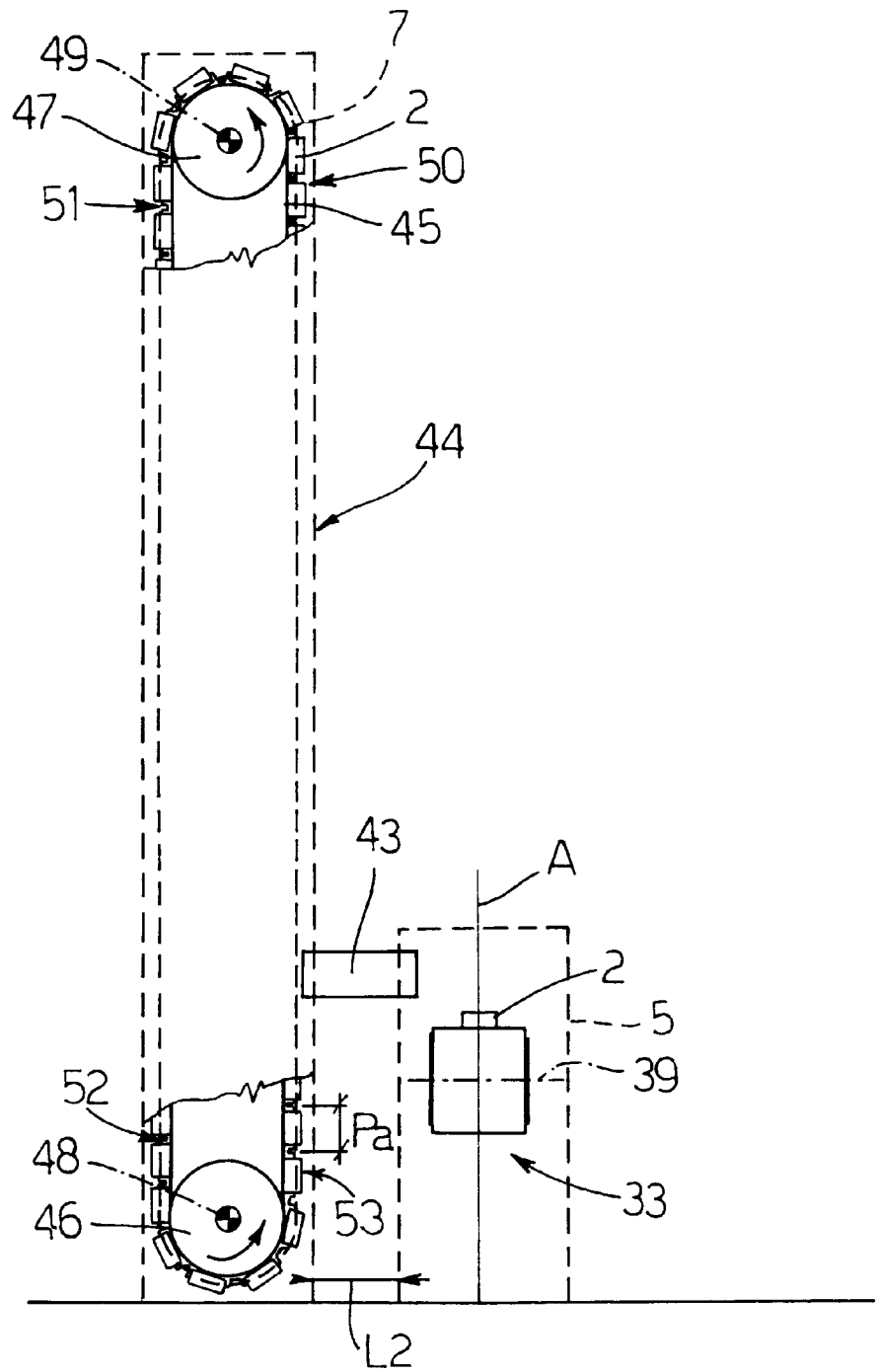
FIG. 3 shows a schematic front view of the FIG. 1 machine.

With reference to FIGS. 1, 2, 3, number 1 indicates a conditioning machine for producing packets 2 of cigarettes. Conditioning machine 1 comprises a portion 3, indicated by a dash line in FIGS. 1 and 2, in which equioriented cigarettes 4 are supplied in bulk; a portion 5, indicated by a dash line in FIGS. 1 to 3, in which cigarettes 4 are fed in orderly groups 6 which are packed to form packets 2; and a portion 7 in which packets 2 are stabilized.

Portion 3 is defined by a hopper 8 adjacent to portion 5 and comprising two lateral walls 9, an inlet 10 for cigarettes 4, and nine outlets 11 aligned with one another beneath inlet 10. Each outlet 11 comprises two lateral walls 12 and, between the lateral walls, seven partitions 13 defining, together with lateral walls 12, a number of substantially vertical channels 14 extending between an inlet 15 and a plate 16 located beneath outlet 11. Cigarettes 4 have respective longitudinal axes 4a, are equioriented, and travel down hopper 8 under their own weight and substantially in a vertical direction D1. At outlets 11, cigarettes 4 drop down into channels 14, and travel along channels 14 in respective columns 17; the cigarettes 4 in each column 17 are fed one at a time onto bottom plate 16 of respective outlet 11; and each cigarette 4 coming out of each outlet 11 becomes part of a respective orderly layer 18 of cigarettes 4 containing a given number of cigarettes 4 equal to the number of channels 14 of outlet 11.

A known device 19 for transferring layers 18 is provided between portion 3 and portion 5 to feed layers 18 to portion 5, which is defined by a feed conveyor 20 comprising a chain 21 looped about two pulleys 22, 23 rotating about respective axes 24, 25. Conveyor 20 also comprises a number of seats 26 equally spaced along chain 21 to house layers 18; chain 21 comprises a bottom branch 27, and a top branch 28 extending at nine outlets 11; and transfer device 19 provides for successively feeding three superimposed layers 18 into each seat 26 to form a group 6 of cigarettes 4.

Conveyor 20 also comprises a transfer wheel 29 coaxial with pulley 23 and for transferring groups 6 in known manner from seats 26 of conveyor 20 to a packing drum 30. Portion 5 also comprises a further packing drum 31, a transfer conveyor 32, and an output conveyor 33, which are arranged in succession and define, together with conveyor 20, a supply path P1 extending substantially in a horizontal direction D2 and lying in a plane A. Portions 3 and 7 are located on the same side of plane A and at respective distances L1 and L2 from portion 5.

Drum 30 rotates clockwise, in FIG. 1, about a respective axis 34 perpendicular to plane A, while drum 31 rotates anticlockwise, in FIG. 1, about a respective axis 35 parallel to axis 34. Drums 30 and 31 comprise respective successions of known pockets (not shown) equally spaced about respective axes 34 and 35 and for receiving groups 6 as packing material is applied in known manner (not shown) about groups 6 to form packets 2. An adhesive substance is applied in known manner (not shown) to the packing material as it is fed about drum 31; and conveyor 32 comprises a succession of known seats (not shown), which are fed clockwise, in FIG. 1, about an axis 36 to transfer packets 2 from drum 31 to output conveyor 33.

Output conveyor 33 comprises a chain 37 looped about two pulleys 38 rotating anticlockwise in FIG. 1 about respective axes 39, and having a bottom branch 40 and a top branch 41; and a number of seats 42 equally spaced along chain 37 to house respective packets 2.

A device 43 for transferring packets 2 is provided between portion 5 and portion 7 to remove packets 2 off top branch 41 of conveyor 33 and feed packets 2 to a drying conveyor 44 forming part of portion 7 and for drying said adhesive substance.

As shown in FIGS. 2 and 3, conveyor 44 is located alongside portion 5, on the same side of portion 5 to hopper 8, extends substantially in a vertical direction D3, and comprises a pair of chains 45 looped about two pulleys 46, 47, which rotate anticlockwise in FIG. 3 about respective horizontal axes 48, 49 parallel to plane A, and are located one over the other to divide conveyor 44 into an upward branch 50 and a downward branch 51. Conveyor 44 also comprises a succession of rods 52 equally spaced along chains 45 with a spacing Pa, and which connect chains 45 to define, between each pair of adjacent rods 52, six seats 53 aligned in direction D2. Each seat 53 houses a respective packet 2, and travels along a respective path Pe (Pe1, Pe2, . . . , Pe6) lying in a respective plane B (B1, B2, . . . , B6) perpendicular to plane A. In a variation not shown, direction D3 is a substantially horizontal direction perpendicular to plane A.

In actual use, equioriented cigarettes 4 travel down hopper 8 in substantially vertical direction D1 onto plates 16 to form, in succession, respective layers 18, each containing a given number of cigarettes 4. Transfer device 19 removes layers 18 off plates 16, and transfers layers 18 into seats 26 on conveyor 20 so as to superimpose three layers 18 and so form a group 6 of cigarettes 4. Being removed cyclically, layers 18 are formed substantially in steps, and a sufficient interval is allowed between one layer 18 and the next to allow cigarettes 4 to drop down channels 14 and form another layer 18 on respective plate 16. Portion 3 is a slow portion comprising nine outlets 11 for simultaneously forming nine layers 18 and, therefore, three groups 6 of cigarettes. That is, slow portion 3 comprises three lines for forming groups 6.

Conveyor 20, drums 30, 31, and conveyors 32, 33 are operated continuously to feed groups 6 and packets 2 along path P1, which comprises a straight portion 54 parallel to direction D2, an undulated portion 55, and a straight portion 56 also parallel to direction D2. That is, path P1 is substantially parallel to direction D2, extends from portion 3 to portion 7, and lies in vertical plane A, which is perpendicular to the axes 4a of cigarettes 4 inside hopper 8.

Transfer device 43 transfers packets 2 from portion 5 to portion 7 so as to simultaneously feed six packets 2 into respective empty seats 53 of drying conveyor 44, which is operated in steps, each equal to spacing Pa. Alternatively, conveyor 44 may be operated continuously at one sixth the traveling speed of conveyor 20, drums 30, 31, and conveyors 32, 33 of portion 5.

Figure 4:
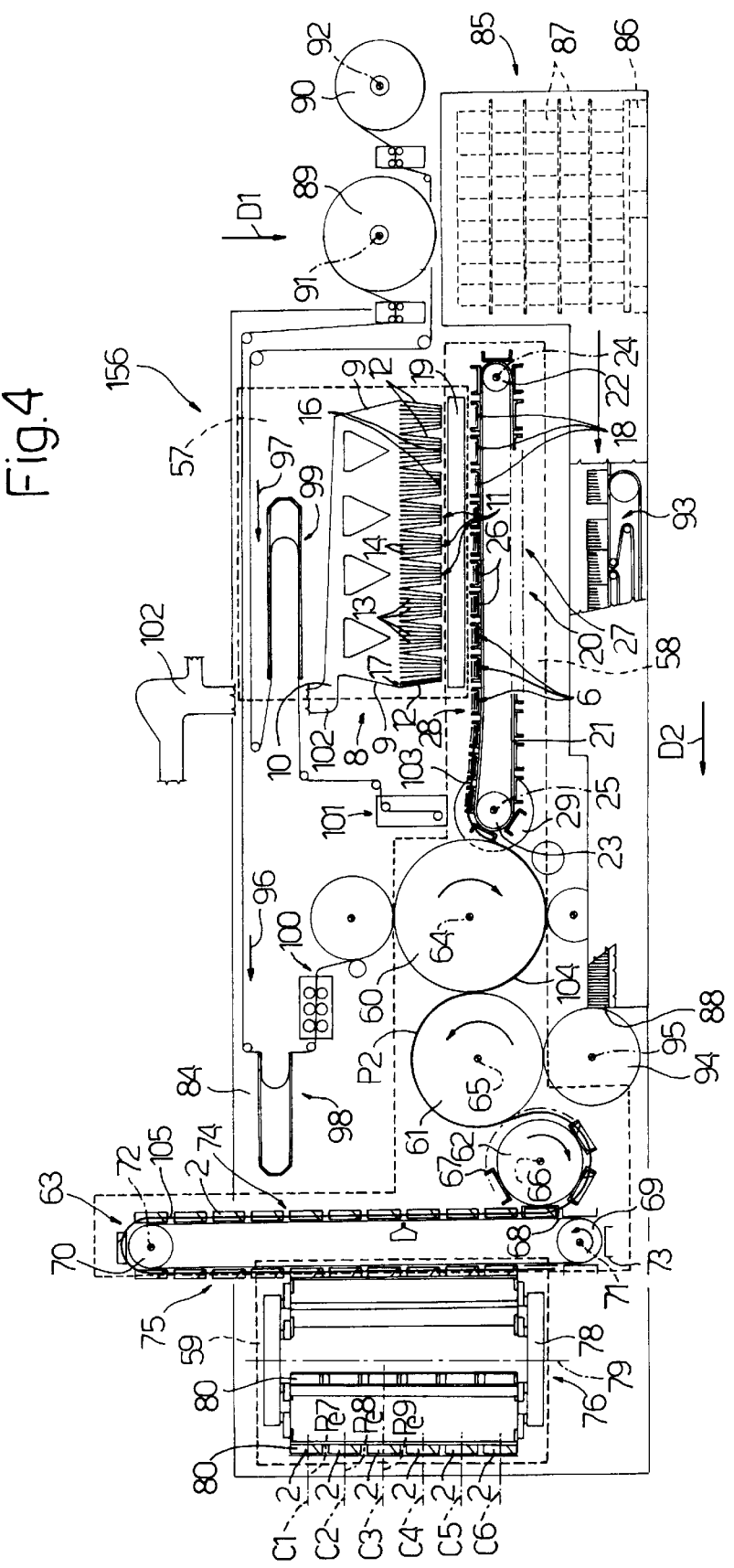
FIG. 4 shows a schematic view of a second embodiment of the machine according to the invention.
Figure 5:
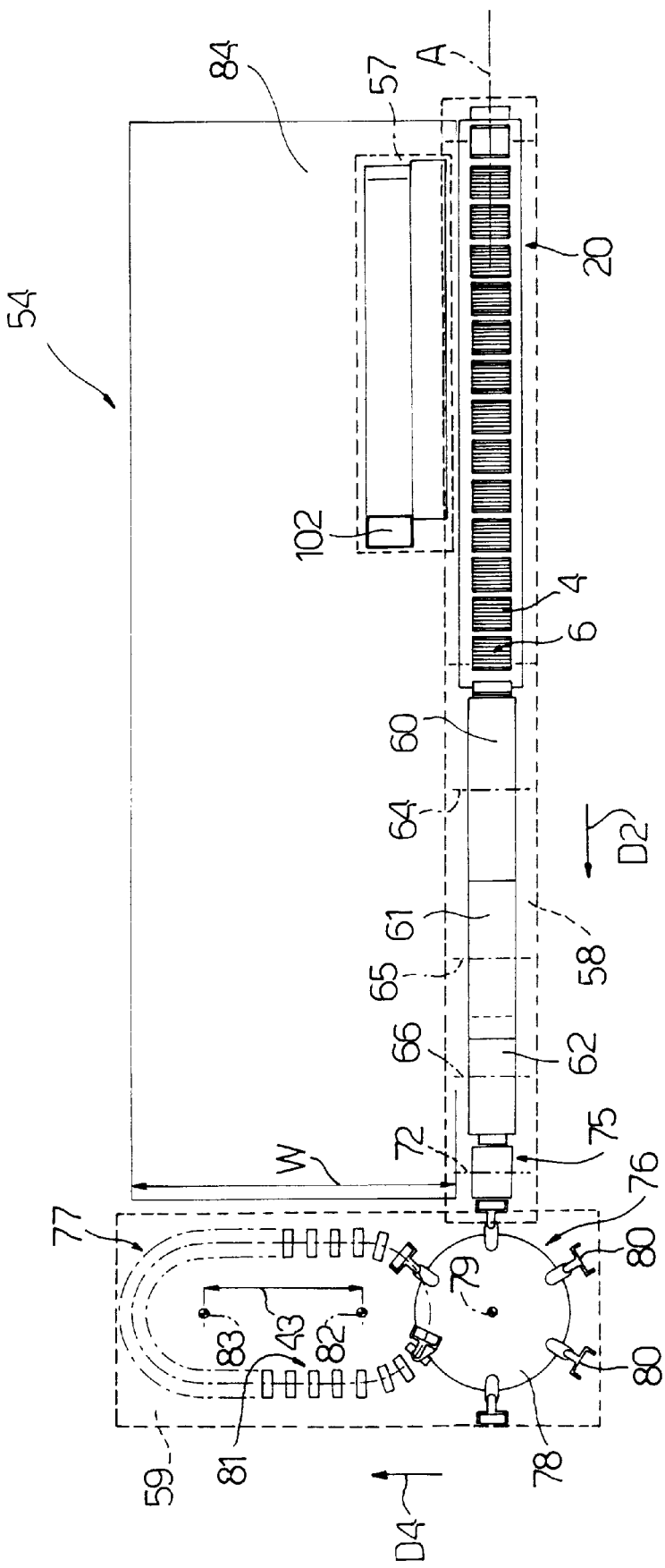
FIG. 5 shows a schematic plan view of the FIG. 4 machine.

With reference to FIGS. 4, 5, 6, number 156 indicates a conditioning machine for producing packets 2 of cigarettes. Conditioning machine 156 comprises a portion 57, indicated by a dash line in FIGS. 4 and 5, in which equioriented cigarettes 4 are supplied in bulk; a portion 58, indicated by a dash line in FIGS. 4 and 5, in which cigarettes 4 are fed in orderly groups 6, which are packed to form packets 2; and a portion 59, indicated by a dash line in FIGS. 4 to 6, in which the so formed packets 2 are stabilized.

Portion 57 is defined by hopper 8, along which the equioriented cigarettes are fed in direction D1. Cigarette layers 18 are formed in portion 57 and transferred from portion 57 to portion 58 by device 19.

Portion 58 is defined by feed conveyor 20, packing drums 60, 61, 62 and an output conveyor 63. Drum 60 rotates clockwise, in FIG. 4, about a respective axis 64 perpendicular to plane A; drum 61 rotates anticlockwise, in FIG. 4, about a respective axis 65 parallel to axis 64; and drum 63 rotates clockwise, in FIG. 4, about a respective axis 66 parallel to axis 64. Drums 60 and 61 comprise respective successions of known pockets (not shown) equally spaced about respective axes 64 and 65 and for receiving groups 6 as packing material is applied in known manner about groups 6 to form packets 2. Drum 62 comprises pockets 67 for transferring unfinished packets 2 to output conveyor 63. Conveyor 63 comprises a chain 68 looped about pulleys 69 and 70, which are arranged one over the other and rotate about respective axes 71 and 72 parallel to axis 64. Conveyor 63 also comprises a succession of pockets 73 equally spaced along chain 68 to hold unfinished packets 2 and to perform further packing operations, in particular, connecting parts of unfinished packets 2 in known manner with an adhesive substance. Conveyor 63 has two branches 74 and 75, which are parallel to each other and to direction D1, and conveyor packets 2 respectively up and down.

A device 76 for transferring packets 2 is provided between portion 58 and portion 59 to remove packets 2 off branch 75 of conveyor 63 and feed packets 2 to a drying conveyor 77 forming part of portion 59 and for drying said adhesive substance.

As shown in FIGS. 4, 5 and 6, device 76 is located alongside branch 75, and comprises a carousel conveyor 78 rotating anticlockwise, in FIG. 5, about a vertical axis 79, and comprising a number of pockets 80 equally spaced about axis 79. Each pocket 80 contains six superimposed packets 2, which are transferred from branch 75 to drying conveyor 77. Drying conveyor 77 is defined by a chain conveyor 81 comprising two pulleys (not shown), which rotate, anticlockwise in FIG. 5, about respective vertical axes 82 and 83. Conveyor 81 has six hook-shaped drying paths Pe7, Pe8, Pe9, Pe10, Pe11 and Pe12, which are parallel to one another and to a horizontal plane C perpendicular to plane A. In other words, drying paths Pe7, Pe8, Pe9, Pe10, Pe11 and Pe12 lie in respective horizontal planes C1, C2, C3, C4, C5 and C6 parallel to one another and perpendicular to plane A.

Machine 156 also comprises a central body 84, which supports portions 57, 58, 59 and contains several transmissions (not shown) and electric motors (not shown). The distance L3 between axes 82 and 83 is less than the width W of body 84.

Machine 156 comprises a packing material loading station 85, in which a pallet 86 of stacks 87 of blanks 88 for packets 2 is located, and in which reels 89 and 90 of packing material are supported about respective axes 91 and 92 perpendicular to plane A. With reference to FIG. 4, loading station 85 is located to the right of portions 57 and 58, close to body 84, and on the opposite side to portion 59 in direction D2.

Machine 156 comprises a conveyor 93 for feeding stacks 87 from pallet 86 to a drum 94 rotating about a respective axis 95 perpendicular to plane A and for distributing blanks 88 to respective groups 6 fed by drum 61. The packing material unwound off reels 89 and 90 is guided along respective paths 96 and 97 to groups 6 fed by drum 60. Conveyor 93 and paths 96 and 97 extend substantially in direction D2 to feed blanks 88 and the packing material from right to left in FIG. 4. Machine 156 also comprises stores 98 and 99 and cutting devices 100 and 101 along respective paths 96 and 97 for cutting sheets (not shown) in known manner off the packing material.

Machine 156 comprises a channel 102 located over, and for feeding cigarettes 4 to, hopper 8.

In actual use, equioriented cigarettes 4 travel down hopper 8 in a substantially vertical direction D1 to simultaneously form nine layers 18, and therefore three groups 6 of cigarettes, in the same way as on machine 1. That is, slow portion 57 comprises three lines for simultaneously forming three groups 6.

Conveyor 20 and drums 60, 61, 62 are operated continuously to feed groups 6 and packets 2 along a path P2, which comprises a straight portion 103 parallel to direction D2, an undulated portion 104, and a hook-shaped portion 105. That is, path P1 extends in direction D2 from portion 57 to portion 59, and lies in vertical plane A. Straight portion 103 substantially corresponds to the upper branch 28 of conveyor 20; the undulated portion 104 of path P2 extends about drums 60, 61 and 62; and the hook-shaped portion 105 is substantially defined by branches 74 and 75 connected about pulley 70.

Conveyor 63 is operated in known manner to feed packets 2 continuously along branch 74 and in steps along branch 75. At portion 58, path P2 is substantially curved and connects portion 57 to portion 59 by transferring groups 6 and packets 2 in direction D2.

Transfer device 76 is operated continuously and transfers packets 2 from portion 58 to portion 59 so as to simultaneously feed six packets 2 to drying conveyor 77, which is operated in steps.

Alternatively, conveyor 77 may be operated continuously at one sixth of the traveling speed of conveyor 20.

What is claimed is:

1. A machine for making packets of cigarettes, each packet (2) comprising a group (6) containing a given number of cigarettes (4), each group (6) containing a given number of layers (18); wherein said machine (1; 56) comprises a first portion (3; 57) comprising a hopper (8) having a plurality of outlets (11) for feeding the cigarettes (4) in a first direction (D1); a second portion (5; 58) comprising a succession of conveyors (20, 30, 31, 32, 33; 20, 60, 61, 62) operated continuously, adjacent to one another and defining a single supply path (P1; P2) having one path portion (54; 103) extending in a second direction (D2) crosswise with respect to said first direction (D1) for receiving said layers from said plurality of outlets (11), and an undulated path portion (55; 104) for forming said packets; and a third portion (7; 59) comprising a drying conveyor (44; 77) defining a plurality of drying paths (Pe1, Pe2, Pe3, Pe4, Pe5, Pe6, Pe7, Pe8, Pe9, Pe10, Pe11, Pe12) extending parallel to one another in a third direction (D3; D4) extending crosswise to said second direction (D2), each drying path (Pe1, Pe2, Pe3, Pe4, Pe5, Pe6, Pe7, Pe8, Pe9, Pe10, Pe11, Pe12) receiving said packets from said single supply path (P1; P2).

2. A machine as claimed in claim 1, wherein said drying conveyor (44; 77) is operated continuously.

3. A machine as claimed in claim 1, wherein said drying conveyor (44; 77) is operated in steps.

4. A machine as claimed in claim 1, wherein said second direction (D2) is horizontal, and said first and third directions (D1, D3) are vertical.

5. A machine as claimed in claim 4, wherein said drying conveyor (44) is an endless conveyor having a forward branch and a return branch, both parallel to said third direction (D3).

6. A machine as claimed in claim 1, wherein said second and third directions (D2; D4) are horizontal, and said first direction (D1) is vertical.

7. A machine as claimed in claim 6, wherein said drying conveyor (77) is an endless conveyor having a forward branch and a return branch, both parallel to said third direction (D4).

8. A machine as claimed in claim 1, wherein said machine (56) comprises a loading station (85) for loading reels (88, 89) of packing material and stacks (87) of blanks (88), said station being adjacent to said first portion.

9. A machine as claimed in claim 8, wherein said machine comprises a conveyor (93) for feeding said blanks (88) in said second direction (D2).

* * * * *